(12) United States Patent
Kamm et al.

(10) Patent No.: US 10,539,763 B2
(45) Date of Patent: Jan. 21, 2020

(54) OPTICAL SYSTEM, ELECTRONIC DEVICE, CAMERA, METHOD AND COMPUTER PROGRAM

(71) Applicant: Sony Corporation, Tokyo (JP)

(72) Inventors: Markus Kamm, Karlsruhe (DE); Fabian Schaschek, Stuttgart (DE); Norihiro Tanabe, Atsugi (JP); Yoshikuni Nomura, Atsugi (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/454,032

(22) Filed: Mar. 9, 2017

(65) Prior Publication Data
US 2017/0285307 A1    Oct. 5, 2017

(30) Foreign Application Priority Data

Mar. 31, 2016 (EP) .................................. 16163388

(51) Int. Cl.
| | |
|---|---|
| *G02B 13/00* | (2006.01) |
| *G06F 1/16* | (2006.01) |
| *H04N 5/232* | (2006.01) |
| *H04M 1/02* | (2006.01) |
| *G02B 27/28* | (2006.01) |
| *H04N 5/225* | (2006.01) |
| *G02B 27/10* | (2006.01) |
| *G03B 17/17* | (2006.01) |
| *G03B 17/12* | (2006.01) |

(52) U.S. Cl.
CPC ....... *G02B 13/0065* (2013.01); *G02B 13/009* (2013.01); *G02B 27/106* (2013.01); *G02B 27/1066* (2013.01); *G02B 27/283* (2013.01); *G03B 17/12* (2013.01); *G03B 17/17* (2013.01); *G06F 1/1686* (2013.01); *H04M 1/0264* (2013.01); *H04N 5/2258* (2013.01); *H04N 5/23232* (2013.01); *H04N 5/23296* (2013.01); *G03B 2205/0046* (2013.01)

(58) Field of Classification Search
CPC .............. G02B 13/0065; G02B 13/009; G02B 27/288; H04N 5/2258; H04N 5/23232; H04M 1/0264; G06F 1/1686
See application file for complete search history.

(56) References Cited

U.S. PATENT DOCUMENTS

| | | |
|---|---|---|
| 3,945,034 A | 3/1976 | Suzuki |
| 7,236,306 B2 | 6/2007 | Janson, Jr. et al. |
| 7,256,944 B2 | 8/2007 | Labaziewicz et al. |
| 7,453,517 B2 | 11/2008 | Fujimoto et al. |
| 7,551,219 B2 | 6/2009 | Monroe |
| 7,561,191 B2 | 7/2009 | May et al. |

(Continued)

FOREIGN PATENT DOCUMENTS

| | | |
|---|---|---|
| CN | 103592808 | 2/2014 |
| EP | 1 637 912 A2 | 3/2006 |

(Continued)

OTHER PUBLICATIONS

Extended European Search Report dated Aug. 16, 2017 in Patent Application No. 17164027.9.

(Continued)

*Primary Examiner* — Jack Dinh
(74) *Attorney, Agent, or Firm* — Xsensus LLP

(57) ABSTRACT

An electronic device including an optical system that combines a first lens and a second lens by means of a beam splitter.

11 Claims, 6 Drawing Sheets

(56) References Cited

U.S. PATENT DOCUMENTS

| | | |
|---|---|---|
| 8,542,287 B2 | 9/2013 | Griffith et al. |
| 8,553,106 B2 | 10/2013 | Scarff |
| 9,185,291 B1 | 11/2015 | Shabtay et al. |
| 2006/0044454 A1 | 3/2006 | Kuwakino |
| 2010/0165080 A1 | 7/2010 | Yamaguchi et al. |
| 2012/0019660 A1 | 1/2012 | Golan et al. |
| 2012/0026366 A1 | 2/2012 | Golan et al. |
| 2012/0113266 A1 | 5/2012 | Golan et al. |
| 2014/0177023 A1 | 6/2014 | Gao et al. |
| 2014/0218468 A1 | 8/2014 | Gao et al. |
| 2015/0189135 A1 | 7/2015 | Hsu |
| 2015/0244942 A1 | 8/2015 | Shabtay et al. |
| 2016/0007008 A1 | 1/2016 | Molgaard et al. |
| 2017/0031163 A1 | 2/2017 | Gao et al. |

FOREIGN PATENT DOCUMENTS

| | | | |
|---|---|---|---|
| WO | WO 2013/152205 A1 | 10/2013 | |
| WO | WO 2014/083489 A1 | 6/2014 | |

OTHER PUBLICATIONS

Ben A Parslow et al. "Multi-focal Video Fusion with a Beam Splitter Prism", Image Processing Theory, Tools and Applications, 2015 IEEE, 5 pages.

European Office Action dated Aug. 14, 2018 in European Application No. 17164027.9-1020.

US 10,539,763 B2

OPTICAL SYSTEM, ELECTRONIC DEVICE, CAMERA, METHOD AND COMPUTER PROGRAM

TECHNICAL FIELD

The present disclosure generally pertains to the field of digital cameras, in particular to digital cameras with zoom capabilities without mechanically moving parts. The present disclosure also pertains to electronic devices that implement such cameras.

TECHNICAL BACKGROUND

Zoom lenses in general require lens groups which move mechanically along the optical axis in order to vary from short to long focal length, which is equivalent to vary from wide-angle lens mode to tele-lens mode. The ratio between longest and shortest focal length is called zoom ratio. The zoom actuators for the mechanical movement are bulky and therefore difficult to integrate into small cameras such as mobile phone (smartphone) or tablet cameras. Also the mechanical tolerances of the actuators may be too large compared to the small dimension of lenses in smartphone cameras. Moreover the mechanical movement of the zoom actuator is relatively slow, in particular when taking snapshots.

Other approaches realize wide-angle- and tele-mode by using dual cameras, having one wide-angle camera and one tele camera side by side. This approach has the disadvantage of a baseline between the optical axes of wide- and tele-lens, which causes parallax errors between the views of both cameras.

Regardless whether using the dual camera or the zoom actuator approach, in any case the overall length of the tele lens is quite long because of the inherently long focal length of the tele lens.

Although there exist techniques for digital cameras with zoom capabilities, it is generally desirable to provide digital cameras with improved zoom capabilities.

SUMMARY

According to a first aspect the disclosure provides an electronic device including an optical system that combines a first lens and a second lens by means of a beam splitter. Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
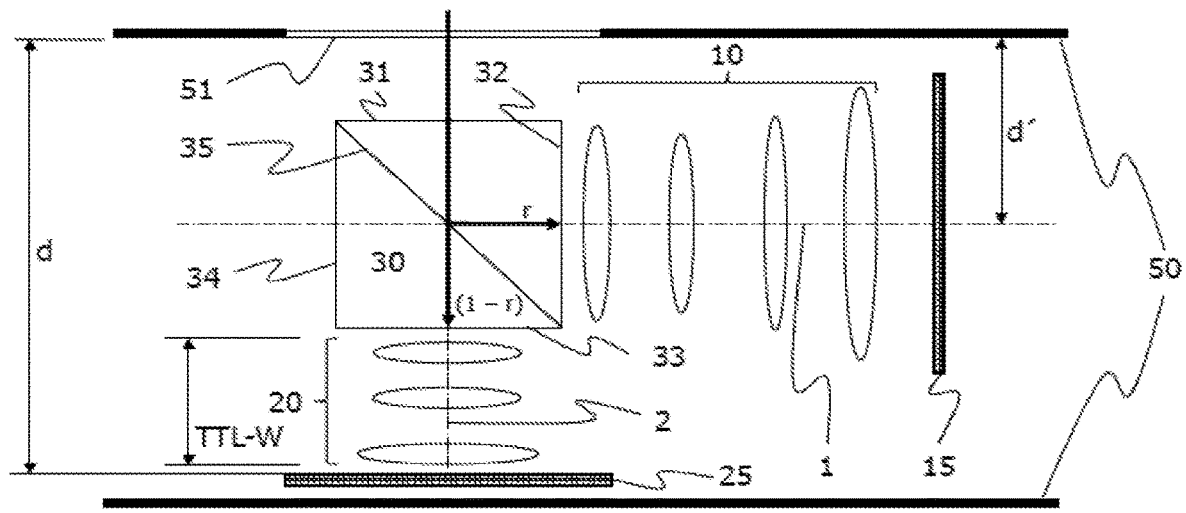
FIG. 1 shows a first embodiment of an optical system with a wide-angle lens and a tele lens that have coincident optical axis.

Before a detailed description of the embodiments under reference of FIG. 1 is disclosed, general explanations are made.

The embodiments described below in more detail disclose an electronic device comprising an optical system that combines a first lens and a second by means of a beam splitter. The electronic device may for example be a camera, in particular a digital camera. The electronic device may also be a smartphone or a tablet computer comprising a camera. Any other use cases where a camera is applied are also possible. In some embodiments, the optical system, e.g. a camera with optical zoom capabilities may be integrated into a mobile phone.

In some embodiments described below in more detail the first lens is a lens with a first focal length and the second lens is a lens with a second Focal length that is longer than the focal length of the First lens. For example, the First lens may be a tele lens that creates a magnified or zoomed image on its respective image sensor, and the second lens may be a wide-angle lens that creates a wide field-of-view (FoV) image on its respective image sensor. An optical system that combines a tele lens and a wide-angle lens by means of a beam-splitter may provide zoom capabilities without mechanically moving parts.

In other embodiments, the first lens and the second lens have the same focal length. Still alternatively, the first lens and the second lens may have a different focal length, but same field of view (in case of different sensor sizes). This may for example allow to combine the high spatial resolution of a black-white (BW) sensor without color filters with the high spectral resolution (but low spatial resolution) of a multi-color sensor.

According to an embodiment, the size of the image sensor of the wide-angle lens and the size of the image sensor of the tele lens are substantially equal. Under the assumption that the size of both image sensors is substantially equal, the focal length of the wide-angle lens is shorter than the focal length of the tele lens. For example the diagonal size of both image sensors may be 6 mm and the focal length of the wide-angle lens may be 4 mm and the focal length of the tele-lens may be 12 mm.

A beam-splitter is an optical device that splits a beam of light in two. According to some embodiments, the beam-splitter is formed as a beam-splitter cube consisting of glass prisms and a beam-splitter surface coated on one side of one of the prisms. The beam-splitter surface may include or even consist of a multi-layer coating which may be adjusted such that (for a certain range of wavelength and angle of incidence) half of the light incident through one "port" (i.e., face of the cube) is reflected and the other half is transmitted due to multi-layer interference. In the embodiments described below, the beam-splitter surface acts as reflection plane that splits light entering through a light entrance in the housing of the electronic device into two light beams. One of the two light beams is directed towards a wide-angle lens and the other of the two light beams is directed towards a tele lens.

According to an optical system of some embodiments, the first lens (e.g. tele lens) and the second lens (e.g. wide-angle lens) have a coincident optical axis at a side of the beam-splitter which receives incident light from a light entrance in a housing of the electronic device. Such an optical system with coincident optical axis at the light receiving side of the beam-splitter (directed towards the light entrance in the housing of the electronic device) may avoid parallax errors.

Still further, according to an optical system of some embodiments, the optical axis of the first lens (e.g. tele lens) is folded by a surface of the beam-splitter. By folding the optical axis of the first lens (e.g. tele lens) by a surface of the beam-splitter the length of the second lens (e.g. wide-angle lens) may be restricted to fit within the limited space between a beam-splitter cube and the edge of a housing of the optical system. The folding of the optical axis may thus help to fit the tele lens within the slim body of a camera. For example, by folding the optical axis of the tele lens the tele lens may fit into the thickness of about 6 mm of a smartphone or tablet computer.

Still further, according to an optical system of some embodiments, a common lens is placed in front of the face of the beam-splitter that receives the incident light. By placing the common lens in front of the face of the beam-splitter that receives the incident light the common lens is integrated into the design of both the first lens (e.g. tele lens) and the second lens (e.g. wide-angle lens), so that the common lens is common part of both the first lens and the second lens. According to the embodiments, the common lens that is arranged before the beam-splitter near the light entrance in the housing of the electronic device narrows down the incoming light bundle. This may allow a smaller size of the beam-splitter cube and more space for the wide-angle lens.

Still further, according to an optical system of some embodiments, the optical axis of the first lens (e.g. tele lens) is folded by less than 90 degrees. In an embodiment where the optical axis of the first lens (e.g. tele lens) is folded by less than 90 degrees a face of the beam-splitter (the face directed towards the first lens) may be tilted so that the folded optical axis of the first lens hits this face of the beam-splitter at normal incidence to avoid refraction of the optical axis.

Still further, in an embodiment where the optical axis of the first lens (e.g. tele lens) is folded by less than 90 degrees the beam-splitter may be placed close to a light entrance of a housing of the electronic device. This may allow to fit the lens elements and housing of the tele lens and an image sensor of the tele lens within the edges of a housing.

Still further, according to an optical system of some embodiments, both the optical axis of the first lens (e.g. tele lens) and the optical axis of the second lens (e.g. wide-angle lens) may be folded by a surface of the beam-splitter. This may further relax the space restrictions for the wide-angle lens.

Still further, according to an optical system of some embodiments, the optical axis of the tele lens may be folded by placing a mirror at a face of the beam-splitter cube that reflects light back into the beam-splitter. By placing a mirror at a face of the beam-splitter cube that reflects light back into the beam-splitter a fraction of the back-reflected light may be redirected by the beam-splitter in direction of the tele lens and a complementary fraction of the back-reflected light may pass the beam-splitter in a direction of a light entrance of a housing of the electronic device, and may thus be lost.

Still further, according to an optical system of some embodiments, the beam-splitter comprises a polarizing beam-splitter surface. The polarizing beam-splitter surface may for example reflect s-polarized light and transmit p-polarized light. The polarizing beam-splitter surface can for example be realized by a stack of interference layers of alternating high- and low-refractive index material. Alternatively it can be realized by a wire grid structure (wire grid polarizers).

Still further, according to an optical system of some embodiments, a quarter-wave retarder plate is arranged after the beam-splitter. This quarter-wave retarder plate may be arranged in such a way that the p-polarized light leaves the beam-splitter and then passes the quarter-wave retarder plate that is arranged after the beam-splitter. In particular, the fast axis of the quarter-wave plate may be oriented at 45 degrees with respect to the polarization direction of the p-polarized light, thereby converting the p-polarized light into circular polarized light. In such an embodiment, after being reflected at a mirror, the circular polarized light changes its chirality, either from left circular to right circular or vice versa, and finally, when passing the quarter-wave retarder plate, it is converted into s-polarized light and enters the beam-splitter. The s-polarized light now is redirected by the polarizing beam-splitter surface in direction of the first lens (e.g. tele lens).

Still further, according to an optical system of some embodiments, a second quarter-wave plate is placed in front of a face of the beam-splitter in a direction of the light entrance in the housing of the electronic device. In particular, the fast axis of the second quarter-wave retarder plate may be oriented at 45 degrees with respect to the polarization direction of p-polarized light. In this embodiment, p- or s-polarized light passing the second quarter-wave retarder plate is converted into circular-polarized light, which is equally split at the polarizing beam-splitter surface. Linear polarized light with polarization direction of +/−45 degrees with respect to the polarization direction of p-polarized (or s-polarized) light is not affected by the second quarter-wave retarder plate and is also equally split at the polarizing beam-splitter surface.

An optical system that combines a wide-angle lens and a tele lens by means of a beam-splitter may provide zoom capabilities without mechanically moving parts.

Still further, according to an optical system of some embodiments, the tele lens is a telephoto lens. A telephoto lens works by having the outermost (i.e. light gathering) element of a much shorter focal length than the equivalent long-focus lens and then incorporating a second set of elements close to the sensor plane that extend the cone of light so that it appears to have come from a lens of much greater focal length. A telephoto ratio is defined by the ratio between the overall length of a lens and its focal length. In practice telephoto ratios of about 80% are typically achieved. For example, if the focal length of the wide angle lens is 4 mm and the zoom ratio is specified to a factor 3, the resulting focal length of the tele lens is 3×4 mm=12 mm. If the tele lens is realized as a telephoto lens with a telephoto ratio of 80%, the remaining length of the tele lens is 0.8×12 mm=9.6 mm, which is still quite large compared to the thickness of a smartphone.

Still further, an electronic device of some embodiments further comprises circuitry configured to digitally combine an image obtained by the image sensor of the second lens with an image obtained by the image sensor of the first lens.

In particular, according to an electronic device of some embodiments, the first lens is a tele lens, the second lens is a wide-angle lens and the circuitry is configured to digitally embed an image obtained by the image sensor of the tele lens into an image obtained by the image sensor of the wide-angle lens.

The circuitry may be a processor that is controlled by software, or the like. The circuitry may for example be configured to digitally embed the image obtained by the tele lens into the wide-angle image by means of digital image processing techniques for creating a digital image with high resolution in the center part and lower resolution in the outer part. Digital interpolation techniques can be used for zooming continuously from the wide-angle image to the tele-image.

Specific embodiments are now described with reference to the accompanying Figures.

FIG. 1 shows a first embodiment of an optical system with a wide-angle lens and a tele lens that have coincident optical axis. The optical axis 1 of the tele lens 10 is folded by a beam-splitter surface 35. A certain fraction r of the incoming light is reflected by the beam-splitter surface 35 and a complementary fraction (1−r) is passing the beam-splitter surface. Light is entering the beam-splitter cube 30 at a first face 31. The folded optical axis 1 is leaving the beam-splitter cube 30 at a second face 32. The optical axis 2 of the wide-angle lens 20 is not folded and the wide-angle lens is placed in close vicinity to a third face 33 of the beam-splitter cube 30. The length TTL-W of the wide-angle lens is restricted to fit within the limited space between beam-splitter cube 30 and the edge of the housing 50. For example the distance from the light entrance 51 of the housing 50 to the wide-angle sensor 25 is limited to d=6 mm and the edge length of the beam-splitter cube 30 is a=2.5 mm. The distance d' between the optical axis 1 of the tele lens and the edge of the housing 50 is at least half of the width of image sensor 15 plus some margin, for example d'=2 mm. In that case the length of the wide-angle lens 20 is limited to TTL-W <(6 mm−2 mm−2.5/2 mm)=2.75 mm.

Figure 2:
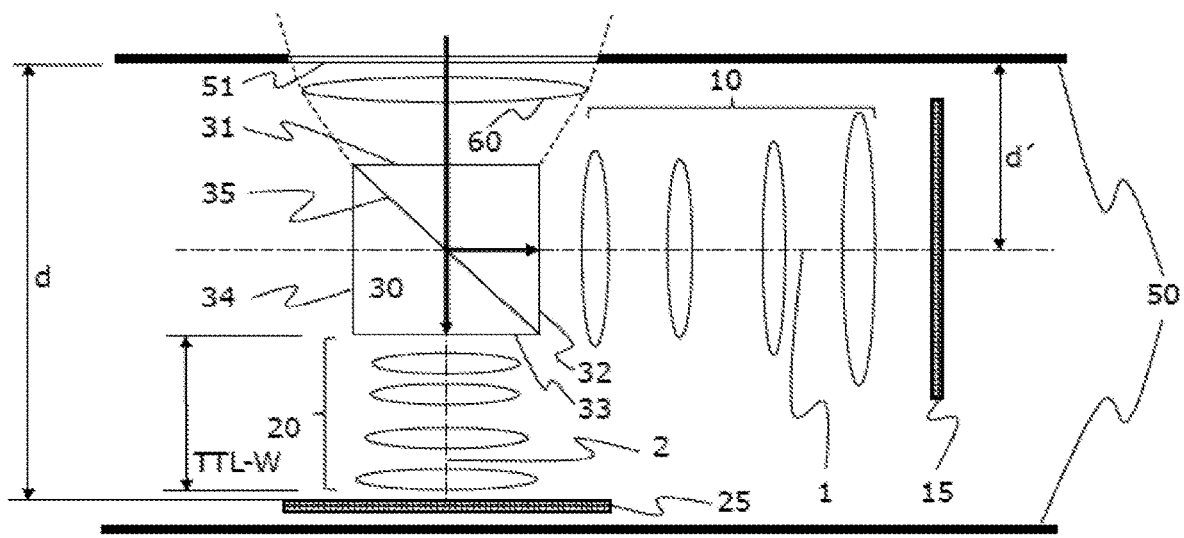
FIG. 2 shows a second embodiment of an optical system with a wide-angle lens and a tele lens that have coincident optical axis.

FIG. 2 shows a second embodiment of an optical system with a wide-angle lens and a tele lens that have coincident optical axis. The embodiment of FIG. 2 is based on the embodiment of FIG. 1. A common lens 60, placed in front of the first face 31 of the beam-splitter cube 30, narrows down the incoming light bundle, thereby allowing a smaller size of the beam-splitter cube and more space for the wide-angle lens. The common lens 60 needs to be integrated into the design of both the tele lens 10 and the wide-angle lens 20.

Figure 3:
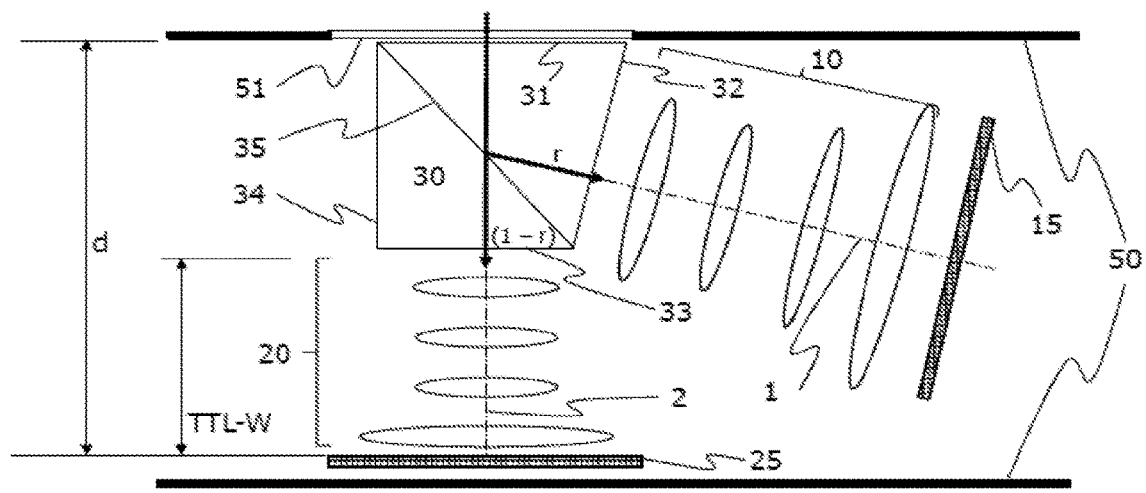
FIG. 3 shows a third embodiment of an optical system with a wide-angle lens and a tele lens that have coincident optical axis.

FIG. 3 shows a third embodiment of an optical system with a wide-angle lens and a tele lens that have coincident optical axis. The embodiment of FIG. 3 is based on the embodiment of FIG. 1. In order to relax the space restrictions for the wide-angle lens, the beam-splitter cube 30 is placed closer to the light entrance 51 of the housing 50. In that case the optical axis 1 of the tele lens is folded by less than 90 degrees in order to fit the lens elements and housing of the tele lens 10 and the tele image sensor 15 within the edges of the housing 50. In that case the second face 32 of the beam-splitter cube 30 needs to be tilted in order to ensure that the folded optical axis 1 hits the second face 32 at normal incidence to avoid refraction of the optical axis.

Figure 4:
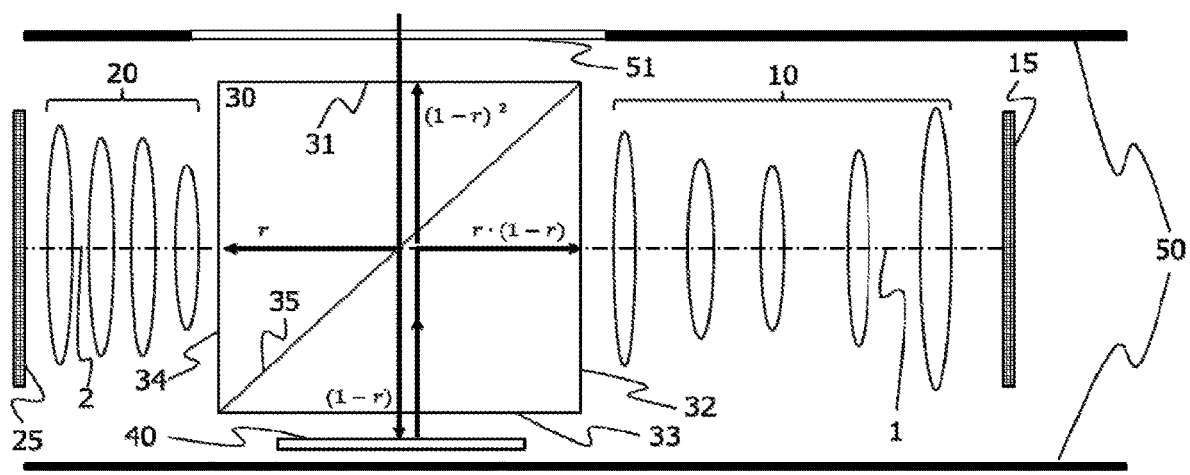
FIG. 4 shows a fourth embodiment of an optical system with a wide-angle lens and a tele lens that have coincident optical axis.

FIG. 4 shows a fourth embodiment of an optical system with a wide-angle lens and a tele lens that have coincident optical axis. The embodiment of FIG. 4 is based on the embodiment of FIG. 1. In order to further relax the space restrictions for the wide-angle lens 20, both the optical axis 1 of the tele lens and the optical axis 2 of the wide-angle lens 20 are folded. This is realized by a mirror 40, placed at the third face 33 of the beam-splitter cube 30. Light is back-reflected by this mirror into the beam-splitter cube 30 and a fraction r of the back-reflected light is redirected by the beam-splitter surface 35 in direction of the second face 32 and entering the tele lens 10. The complementary fraction (1−r) of the back-reflected light is passing the beam-splitter surface 35 in direction of the first face 31 and is lost. This limits the light efficiency of the tele lens path. For example the fraction of light which is reflected at the beam-splitter surface 35 is r=50% and 100% of the light is reflected at the mirror. In that case only 0.5*(1−0.5)=25% of the incoming light is finally entering the tele lens.

Figure 5:
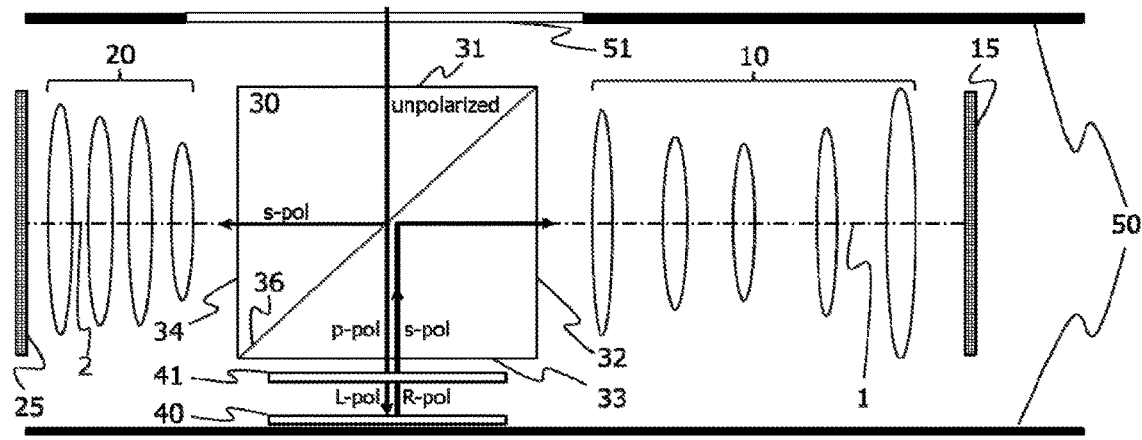
FIG. 5 shows a fifth embodiment of an optical system with a wide-angle lens and a tele lens that have coincident optical axis.

FIG. 5 shows a fifth embodiment of an optical system with a wide-angle lens and a tele lens that have coincident optical axis. The embodiment of FIG. 5 is based on the embodiment of FIG. 4. In order to overcome the limitations from FIG. 4 regarding light efficiency, the beam-splitter surface is realized as a polarizing beam-splitter surface 36. It reflects s-polarized light and transmits p-polarized light. The p-polarized light leaves the beam-splitter cube at the third face 33 and passes a quarter-wave retarder plate 41. The fast axis of the quarter-wave plate 41 is oriented at 45 degrees with respect to the polarization direction of the p-polarized light, thereby converting the p-polarized light into circular polarized light. After being reflected at the mirror 40, the circular polarized light changed its chirality, either from left circular to right circular or vice versa, and finally, when passing the quarter-wave retarder plate 41, it is converted into s-polarized light and enters the third face 33 of the beam-splitter cube 30. The s-polarized light now is redirected by the polarizing beam-splitter surface 36 in direction of the second face 32 and enters the tele lens 10.

The polarizing beam-splitter surface 36 can be realized by a stack of interference layers of alternating high- and low-refractive index material. Alternatively it can be realized by a wire grid structure (wire grid polarizers).

For example, the polarizing beam-splitter coating 36 reflects r=99% of the incoming s-polarized light and transmits t=90% of the p-polarized light. The mirror 40 may reflect about 92% of the light and the conversion efficiency of the quarter-wave retarder plate 41 for converting linear polarized light into circular polarized light and vice versa is about 95%. For the case of incoming unpolarized light (50% s- and 50% p-polarized), the amount of light entering the tele lens can be estimated at 0.5*0.9*0.95*0.92*0.95*0.99=37% of the incoming light.

Figure 6:
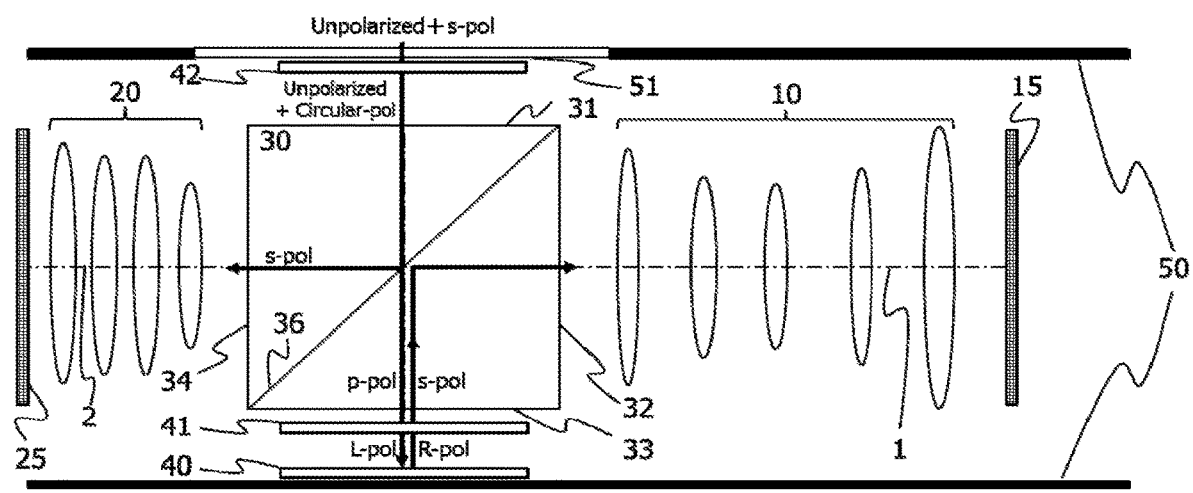
FIG. 6 shows a sixth embodiment of an optical system with a wide-angle lens and a tele lens that have coincident optical axis.

FIG. 6 shows a sixth embodiment of an optical system with a wide-angle lens and a tele lens that have coincident optical axis. The embodiment of FIG. 6 is based on the embodiment of FIG. 5. Light glare coming from specular reflections is often partially linear-polarized. Such partially linear-polarized light would be unequally split at the polarizing beam-splitter surface 36, leading to an unequal intensity of glare at the image sensors 15 and 25. In order to match the glare equally between image sensors 15 and 25 a second quarter-wave plate 42 is placed in front of the first face 31 of the beam-splitter cube 30. The fast axis of the second quarter-wave retarder plate 42 is oriented at 45 degrees with respect to the polarization direction of p-polarized light. P- or s-polarized light passing the second quarter-wave retarder plate 42 is converted into circular-polarized light, which is equally split at the polarizing beam-splitter surface 36. Linear polarized light with polarization direction of +/−45 degrees with respect to the polarization direction of p-polarized (or s-polarized) light is not affected by the second quarter-wave retarder plate 42 and is also equally split at the polarizing beam-splitter surface 36.

Figure 7:
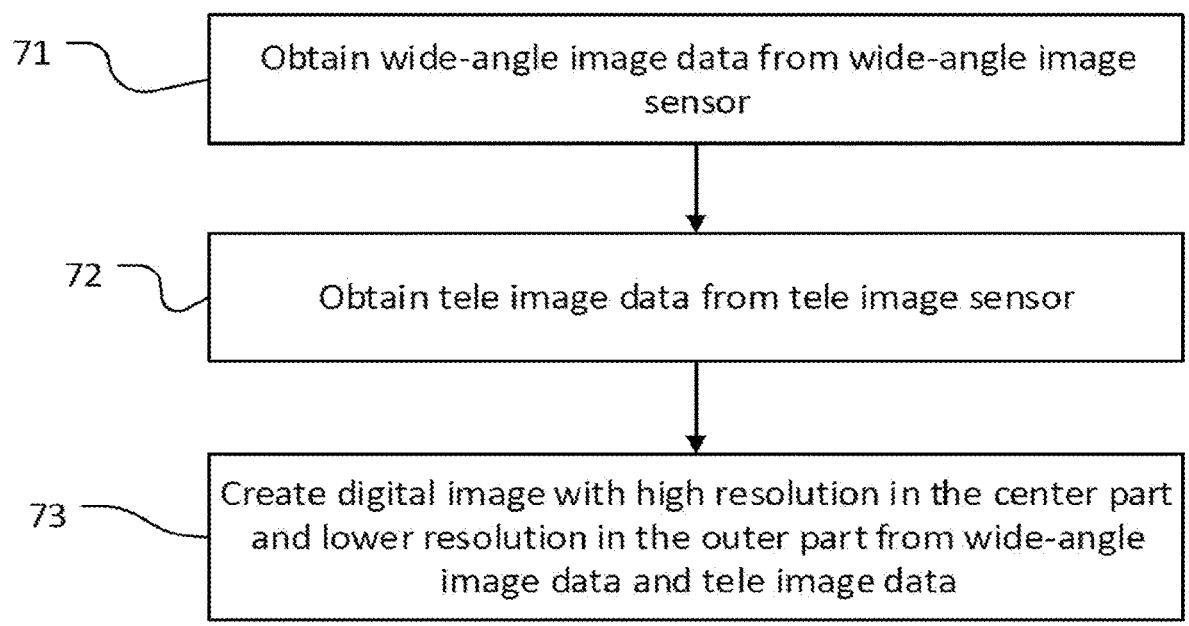
FIG. 7 schematically describes a method of generating a combined image from wide-angle image data and tele image data.

FIG. 7 schematically describes a method of generating a combined image from wide-angle image data and tele image data. At 71, wide-angle image data is obtained from a wide-angle image sensor. At 72, tele image data is obtained from a tele image sensor. At 73, a combined image that is a digital image with high resolution in the center part and lower resolution in the outer part is created from the wide-angle image data and the tele image data.

Figure 8:
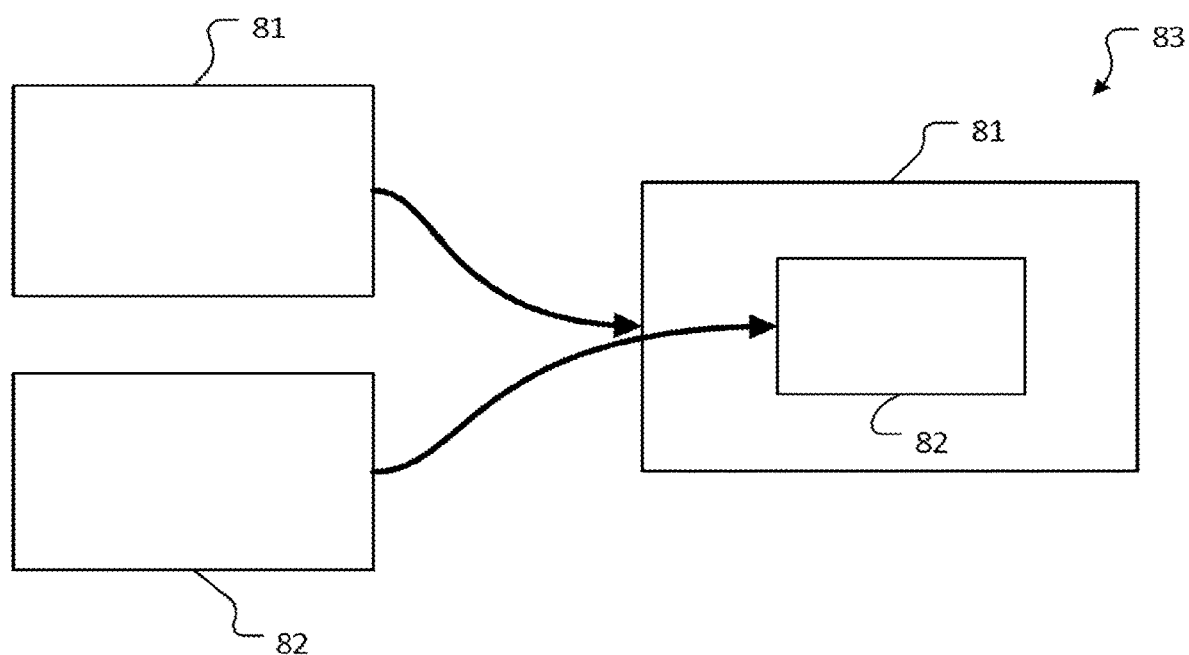
FIG. 8 schematically depicts a process of generating a combined image from wide-angle image data and tele image data.

FIG. 8 schematically depicts a process of generating a combined image from wide-angle image data and tele image data. A combined image 83 is created from a wide-angle image data 81 and a tele image data 82. The combined image 83 is a digital image with high resolution in the center part and lower resolution in the outer part.

Figure 9:
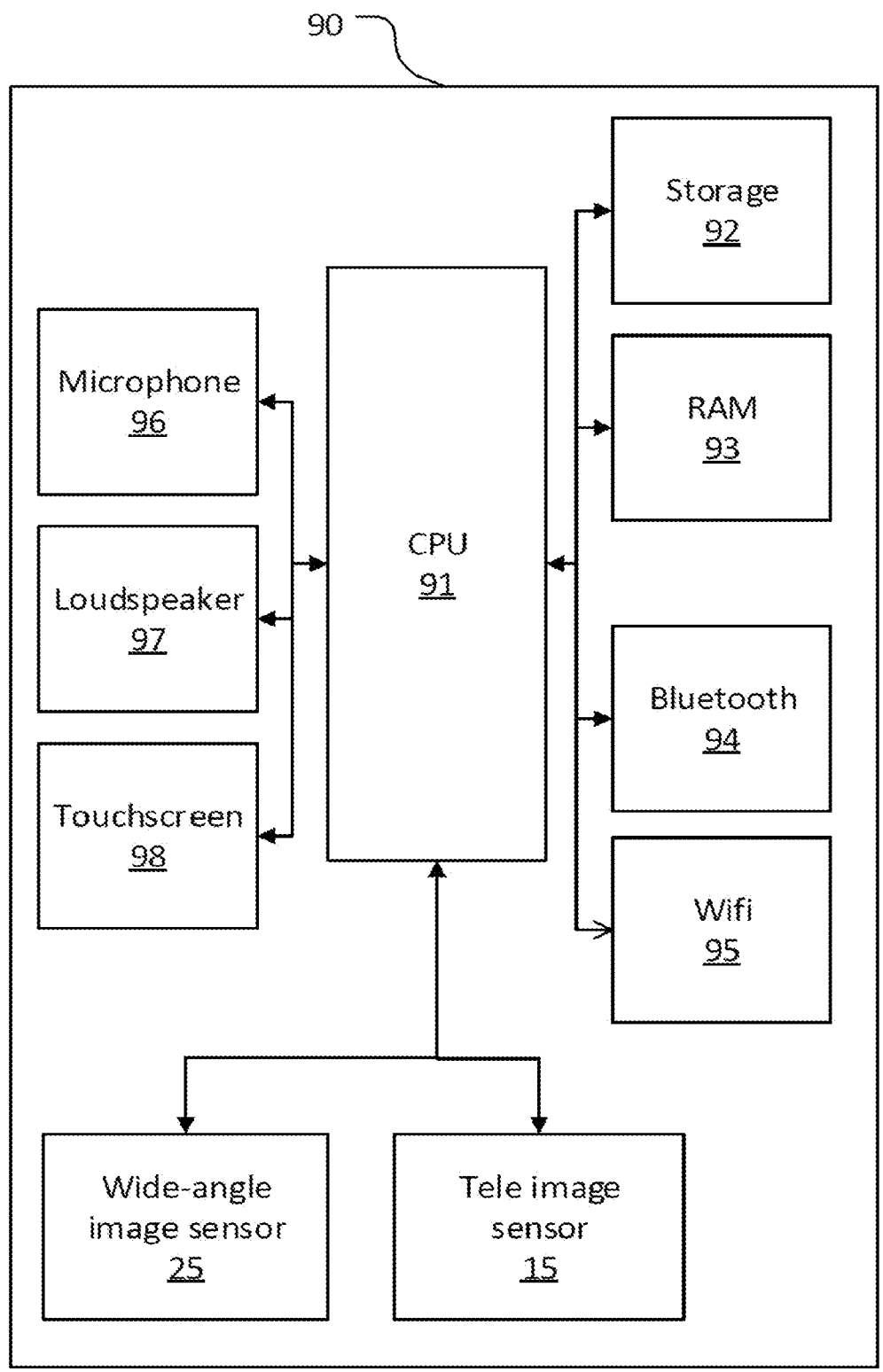
FIG. 9 schematically describes an embodiment of an electronic device, here e.g. a smartphone, that comprises a wide-angle image sensor and a tele image sensor.

FIG. 9 schematically describes an embodiment of an electronic device, here e.g. a smartphone, that includes a wide-angle image sensor and a tele image sensor. The electronic device 90 includes a CPU 91 as processor. The electronic device 90 further includes a microphone 96, a loudspeaker 97, and a touchscreen 98 that are connected to the processor 91. These units 96, 97, 98 act as a man-machine interface and enable a dialogue between a user and the electronic device. The electronic device 90 further includes a Bluetooth interface 94 and a Wifi interface 95. These units 94, 95 act as I/O interfaces for data communication with external devices such as cloud platforms for uploading images taken with the electronic device. The electronic device 90 further includes a wide-angle image sensor 25 that cooperates with a wide-angle lens (see 20 in FIGS. 1-6) and a tele image sensor 15 that cooperates with a tele lens (see 10 in FIGS. 1-6). These image sensors 15 and 25 provide image data, in particular wide-angle image data (81 in FIG. 8) that is obtained by the wide-angle image sensor 25 and tele image data (82 in FIG. 8) that is obtained by the tele image sensor 15. The processor 91 executes interpolation software that combines the wide-angle image data obtained by wide-angle image sensor 25 and the tele image data obtained by tele image sensor 15 to obtain a combined image (83 in FIG. 8). The electronic device 90 further includes a data storage 92 and a data memory 93 (here a RAM). The data memory 93 is arranged to temporarily store or cache data or computer instructions for processing by processor 91. The data storage 92 is arranged as a long term storage, e.g. for recording image data obtained from image sensors 15, 25.

Summarizing, in the embodiments of FIG. 1 to FIG. 3, exemplary, the optical axis of the first lens (tele lens) is folded by the beam-splitter coating, in order to fit the longer tele lens within the 6 mm size restriction discussed above. In the embodiments of FIG. 4 to FIG. 6, the optical axis of the second lens (wide-angle lens) is, exemplary, directly folded by the beam-splitter coating. Hence, in some embodiments the path length of the directly folded path is shorter than path which is reflected by the mirror of the beam-splitter. In some embodiments, with a shorter path length, the larger field of view of the wide-angle lens can better fit within the limited size of the beam-splitter cube.

In the above an optical system for an electronic device such as a digital camera or smartphone was described with reference to the embodiments of FIGS. 1 to 6 above. The disclosure is, however, not limited to these embodiments.

For example, in the embodiments of FIG. 4 to FIG. 6, the beam-splitter surface 36 can be flipped such, that the light enters the tele lens on direct and the wide-angle lens on the back-reflected way respectively.

Still further, the sensors 15 and 25 might be of different type. For example one sensor may be a sensor without color filters and the other sensor may be a color sensor with Bayer pattern color filters. Or both sensors may have color filters with different pattern and spectral range.

Still further, instead of using a beam-splitter cube consisting of glass prisms and a beam-splitter surface coated on one side of one of the prisms, a beam-splitter plate could be used. It consists of a substrate plate (e.g. glass plate) and a beam-splitter surface coated at one side of the substrate.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering of 71 and 72 in the embodiment of FIG. 7 may be exchanged. Other changes of the ordering of method steps may be apparent to the skilled person.

It should further be recognized that the division of the electronic device 90 into units 91-98 is only made for illustration purposes and that the present disclosure is not limited to any specific division of functions in specific units. For instance, the electronic device 90 could be implemented by a respective programmed processor, field programmable gate array (FPGA) and the like, that combines certain functionality shown in FIG. 9.

It should further be recognized that as far as the disclosure refers to circuitry that is configured to perform a specific function, it is foreseen that circuitry may be configured to perform the specific function by processing instructions such as software, computer programs, and the like. The circuitry may also be distributed between electronic devices and e.g. a cloud platform.

All units and entities of the electronic device described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device including an optical system that combines a first lens and a second lens by means of a beam splitter.

(2) Electronic device of (1), wherein the first lens and the second lens have a coincident optical axis at a side of the beam-splitter which receives incident light from a light entrance in a housing of the electronic device.

(3) The electronic device of (1) or (2) in which the optical axis of the first lens is folded by a surface of the beam-splitter.

(4) The electronic device of anyone of (1) to (3) further including a common lens placed in front of the face of the beam-splitter that receives incident light.

(5) The electronic device of anyone of (1) to (4) wherein the optical axis of the first lens is folded by less than 90 degrees.

(6) The electronic device of anyone of (1) to (5) in which both the optical axis of the first lens and the optical axis of the second lens arc folded by a surface of the beam-splitter.

(7) The electronic device of anyone of (1) to (6) further including a mirror placed at a face of the beam-splitter that reflects light back into the beam-splitter.

(8) The electronic device of anyone of (1) to (7) in which the beam-splitter comprises a polarizing beam-splitter surface.

(9) The electronic device of anyone of (7) or (8) further including a quarter-wave retarder plate arranged between the beam-splitter and the mirror.

(10) The electronic device of (9) further including a second quarter-wave plate placed in front of a face of the beam-splitter in a direction of the light entrance in the housing of the electronic device.

(11) The electronic device of anyone of (1) to (10) in which the first lens is a tele lens that creates a magnified or zoomed image on its respective image sensor, and the second lens is a wide-angle lens that creates a wide field-of-view image on its respective image sensor.

(12) The electronic device of anyone of (1) to (11) in which the tele lens is a telephoto lens.

(13) The electronic device of anyone of (1) to (10) in which the first lens and the second lens have the same focal length.

(14) The electronic device of anyone of (1) to (13), further including circuitry configured to digitally combine an image obtained by the image sensor of the second lens with an image obtained by the image sensor of the first lens.

(15) The electronic device of (14), in which the first lens is a tele lens, the second lens is a wide-angle lens and the circuitry is configured to digitally embed an image obtained by the image sensor of the tele lens into an image obtained by the image sensor of the wide-angle lens.

(16) An optical system that combines a first lens and a second lens by means of a beam splitter.

(17) The optical system of (16), wherein the first lens and the second lens have a coincident optical axis at a side of the beam-splitter which receives incident light from a light entrance in a housing of the electronic device.

(18) The optical system of (16) or (17) in which the optical axis of the first lens is folded by a surface of the beam-splitter.

(19) The optical system of anyone of (16) to (18) further including a common lens placed in front of the face of the beam-splitter that receives incident light.

(20) The optical system of anyone of (16) to (19) wherein the optical axis of the first lens is folded by less than 90 degrees.

(21) The optical system of anyone of (16) to (20) in which both the optical axis of the first lens and the optical axis of the second lens are folded by a surface of the beam-splitter.

(22) The optical system of anyone of (16) to (21) further including a mirror placed at a face of the beam-splitter that reflects light back into the beam-splitter.

(23) The optical system of anyone of (16) to (22) in which the beam-splitter comprises a polarizing beam-splitter surface.

(24) The optical system of anyone of (22) or (23) further including a quarter-wave retarder plate arranged between the beam-splitter and the mirror.

(25) The optical system of (24) further comprising a second quarter-wave plate placed in front of a face of the beam-splitter in a direction of the light entrance in the housing of the electronic device.

(26) The optical system of anyone of (16) to (25) in which the first lens is a tele lens that creates a magnified or zoomed image on its respective image sensor, and the second lens is a wide-angle lens that creates a wide field-of-view image on its respective image sensor.

(27) The optical system of anyone of (16) to (26) in which the tele lens is a telephoto lens.

(28) The optical system of anyone of (16) to (25) in which the first lens and the second lens have the same focal length.

(29) The optical system of anyone of (16) to (28), further including circuitry configured to digitally combine an image obtained by the image sensor of the second lens with an image obtained by the image sensor of the first lens.

(30) The optical system of (29), in which the first lens is a tele lens, the second lens is a wide-angle lens and the circuitry is configured to digitally embed an image obtained by the image sensor of the tele lens into an image obtained by the image sensor of the wide-angle lens.

(31) A method including
obtaining image data from a first image sensor;
obtaining image data from a second image sensor; and
creating a digital image by combining the image data from the first image sensor and the image data from the second image sensor.

(32) The method of (31) in which creating a digital image includes creating a digital image with high resolution in the center part and lower resolution in the outer part from wide-angle image data and tele image data.

The present application claims priority to European Patent Application 16163388.8 filed by the European Patent Office on 31 Mar. 2016, the entire contents of which being incorporated herein by reference.

LIST OF COMPONENTS

1 Optical axis of the tele lens
2 Optical axis of wide-angle lens
10 Tele lens
15 Image sensor of tele lens
20 Wide-angle lens
25 Image sensor of wide-angle lens
30 Beam-splitter cube
31 First face of beam-splitter cube
32 Second face of beam-splitter cube
33 Third face of beam-splitter cube
34 Fourth face of beam-splitter cube
35 Beam-splitter surface
36 Polarizing beam-splitter surface
40 Mirror
41 Quarter-wave retarder plate
42 Second quarter-wave retarder plate
50 Housing
51 Light entrance window
60 Common lens 81 Wide-angle image
82 Tele image
83 Combined image
90 Smartphone
91 CPU
92 Storage
93 RAM
94 Bluetooth
95 Wifi
96 Microphone
97 Loudspeaker
98 Touchscreen

The invention claimed is:

1. An electronic device comprising:
a first image sensor;
a second image sensor;
an optical system including a first lens placed before the first image sensor, a second lens placed before the second image sensor, and a beam-splitter;
a housing including the first image sensor, the second image sensor, and the optical system, wherein
the first lens and the second lens have a coincident optical axis at a side of the beam-splitter which receives incident light from a light entrance in the housing,
an optical axis of the first lens is folded by less than or equal to 90 degrees by a surface of the beam-splitter,
the beam-splitter is placed adjacent to the light entrance in the housing, and the incident light first hits the beam-splitter when the incident light enters the housing from the light entrance,
the light entrance is extending parallel to a wall of the housing,
the second lens and the second image sensor are extending parallel to the light entrance, and
the first lens and the first image sensor are tilted with respect to the coincident optical axis.

2. The electronic device of claim 1, further comprising a mirror placed at a face of the beam-splitter that reflects light back into the beam-splitter.

3. The electronic device of claim 2, wherein the beam-splitter comprises a polarizing beam-splitter surface.

4. The electronic device of claim 3, further comprising a quarter-wave retarder plate arranged between the beam-splitter and the mirror.

5. The electronic device of claim 4, further comprising a second quarter-wave plate placed in front of a face of the beam-splitter in a direction of the light entrance in the housing of the electronic device.

6. The electronic device of claim 1, wherein the first lens is a tele lens that creates a magnified or zoomed image on the first image sensor, and the second lens is a wide-angle lens that creates a wide field-of-view image on the second image sensor.

7. The electronic device of claim 6, wherein the tele lens is a telephoto lens.

8. The electronic device of claim 1, wherein the first lens and the second lens have the same focal length.

9. The electronic device of claim 1, further comprising circuitry configured to digitally combine an image obtained by the second image sensor with an image obtained by the first image sensor.

10. The electronic device of claim 9, wherein the first lens is a tele lens and the second lens is a wide-angle lens, and the circuitry is configured to digitally embed an image obtained by the first image sensor into an image obtained by the second image sensor.

11. The electronic device of claim 1, wherein
a first surface of the beam-splitter facing the first lens is tilted with respect to the coincident optical axis, and
a second surface of the beam-splitter facing the second lens is perpendicular to the coincident optical axis.

* * * * *